US009342926B2

(12) United States Patent
Tokuyoshi (10) Patent No.: US 9,342,926 B2
(45) Date of Patent: May 17, 2016

(54) INFORMATION PROCESSING APPARATUS, METHOD OF CONTROLLING THE SAME, AND STORAGE MEDIUM

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 288 days.

(21) Appl. No.: 14/243,281

(22) Filed: Apr. 2, 2014

(65) Prior Publication Data

US 2014/0313200 A1 Oct. 23, 2014

(30) Foreign Application Priority Data

Apr. 23, 2013 (JP) ................... 2013-090778

(51) Int. Cl.
*G06T 15/50* (2011.01)
(52) U.S. Cl.
CPC ...................... *G06T 15/50* (2013.01)
(58) Field of Classification Search
None
See application file for complete search history.

(56) References Cited

U.S. PATENT DOCUMENTS

| 2008/0143720 | A1* | 6/2008 | Elmquist ............. G06T 15/50 345/426 |
| 2008/0186390 | A1* | 8/2008 | Sato ..................... G06T 3/4053 348/222.1 |
| 2013/0263199 | A1 | 10/2013 | Iwasaki |

FOREIGN PATENT DOCUMENTS

JP 5155462 3/2013

OTHER PUBLICATIONS

Oles Shishkovtsov, "Deferred Shading in S.T.A.L.K.E.R.", GPU Gems 2, Chapter 9, Addison-Wesley, pp. 143-166 (2005).
Robert Herzog et al., "Spatio-Temporal Upsampling on the GPU", Proc. i3D 2010: ACM SIGGRAPH Symposium on Interactive 3D Graphics and Games, pp. 91-98 (2011).

* cited by examiner

*Primary Examiner* — Kee M Tung
*Assistant Examiner* — Xin Sheng
(74) *Attorney, Agent, or Firm* — Greenblum & Bernstein, P.L.C.

(57) ABSTRACT

An information processing apparatus acquires a low resolution indirect illumination buffer having a resolution less than an indirect illumination buffer information used for specifying a specular reflection direction in a position of an object and a reflection characteristic of the object in a 3D scene corresponding to each pixel of the indirect illumination buffer to be generated. Then it generates an indirect illumination buffer by increasing the resolution of the low resolution indirect illumination buffer. Here the apparatus generates the pixels of the indirect illumination buffer generated by the increase in resolution based on at least the level of similarity of the specular reflection lobes of objects corresponding to the pixels and objects corresponding to the pixels of the low resolution indirect illumination buffer used for the generation of the pixels.

13 Claims, 4 Drawing Sheets

INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus, a method of controlling the same, and a storage medium, and particularly to a technique of illuminating computation for 3D scene rendering.

2. Description of the Related Art

3-Dimensional Computer Graphics is used as a visualization expression method in various fields not limited to games and movies. In the technical field of this kind of 3DCG generation, in recent years, various methods have been proposed for more realistic depiction or for high quality rendering expression.

As a method of expression for making more realistic depiction in 3DCG, the method of reflecting effects due to Global Illumination exists. In this method, for one rendering object, by not only rendering shading that occurs directly based on defined illumination (a light source), but also rendering shading considering indirect illumination that appears due to the light emitted from a light source being reflected by another rendering object, a rendering expression having more realism can be provided.

On the other hand, because processing for Global Illumination employs such things as a ray tracing method, which traces the propagation of a light ray, which is complicated, in general it is known that the amount of calculation is large. A variety of optimization methods have been proposed for using this kind of Global Illumination in situations in which real-time screen rendering is required such as games. One optimization method is so called Deferred Rendering (Japanese Patent No. 5,155,462, or Oles Shishkovtsov, "Deferred Shading in S.T.A.L.K.E.R." of GPU Gems 2, Addison-Wesley, 2005, pp. 143-166). In this method, rather than rendering while executing an illuminating computation for each of a plurality of objects included in a rendering scope, rendering of the geometry (G-Buffers) used for the illuminating computation for the entire rendering scope is performed without performing the illuminating computation by the rendering processing of a preceding stage. Then, by rendering a final output screen by executing the rendering processing of a subsequent stage after performing only the necessary illuminating computation on the final output screen using this geometry, and screen generation is performed efficiently without unnecessary illuminating computation.

Also, in recent years, accompanying an increase in resolution of display apparatuses (an increase in pixels in display areas), it has become desirable for home-use game consoles, for example, to have the capability to render screens corresponding to the number of pixels of display apparatuses in real-time. In other words, because the amount of calculation of processing for Global Illumination is proportional to the number of pixels of the screen to be rendered, time required for the rendering processing increases as the number of pixels becomes larger. In Robert Herzog et al., "Spatio-temporal upsampling on the gpu", Proc. i3D 2010: ACM SIGGRAPH Symposium on Interactive 3D Graphics and Games, 2011, p. 91-98, a method for optimizing rendering processing by reducing an amount of calculation by calculating Global Illumination at a resolution less than the final output screen, and after that interpolating needed pixels in upsampling processing is proposed.

In a case of upsampling the results of Global Illumination calculation (an indirect illumination buffer) performed at a low resolution, as in Herzog, values of the pixels (interpolation pixels) generated by the interpolation are calculated by weighted addition to the pixels in the surroundings of the calculation results (surrounding pixels) is the in accordance with depth values of objects rendered in the surrounding pixels
 normal vectors of object surfaces rendered in the surrounding pixels
 the distance between the surrounding pixels and the interpolation pixels
 the time period at which the surrounding pixels were sampled.

In deferred rendering, an indirect illumination buffer is generated based on information of G-Buffers before the rendering processing of a subsequent stage is performed. Specifically, the indirect illumination buffer for diffuse reflection or specular reflection is generated by calculating Global Illumination considering a normal output as a G-Buffer or information of a reflection parameter such as a Phong exponent, for example. In Herzog, an indirect illumination buffer used for a final output screen is generated by increasing resolution based on the above described weighting parameters after these indirect illumination buffers are generated at a low resolution.

However, because, unlike a diffuse reflection for which the reflection direction is defined in accordance with a normal vector, for a specular reflection, the reflection direction changes in accordance with the eye direction, a specular reflection could not be reproduced suitably with the above described weighting parameters.

SUMMARY OF THE INVENTION

The present invention was made in view of such problems in the conventional technique. The present invention provides an information processing apparatus, a method of controlling the same, and a storage medium for suitably reproducing at high speed a specular reflection in a 3D scene.

The present invention in its first aspect provides an information processing apparatus that generates an indirect illumination buffer for a specular reflection used for rendering a 3D scene, comprising: a determination unit which is able to determine a viewpoint parameter for which the indirect illumination buffer is to be rendered; an acquisition unit which is able to acquire a low resolution indirect illumination buffer having a resolution less than the indirect illumination buffer, and information used for identification of reflection characteristics of objects in the 3D scene corresponding to the pixels of the indirect illumination buffer to be generated and specular reflection directions in positions of the objects; and a generation unit which is able to generate the indirect illumination buffer by increasing the resolution of the low resolution indirect illumination buffer acquired by the acquisition unit, wherein the generation unit generates a pixel of the indirect illumination buffer generated by the increase in resolution based on at least a level of similarity of specular reflection lobes, between an object corresponding to the pixel and an object corresponding to a pixel of the low resolution indirect illumination buffer used for generation of the pixel, for an eye direction defined by the viewpoint parameter determined by the determination unit and information used for identification of the specular reflection direction of each object.

The present invention in its second aspect provides an information processing apparatus that generates a screen into which a 3D scene is rendered, comprising: a determination unit which is able to determine a viewpoint parameter for which the screen is to be rendered; an acquisition unit which is able to acquire, based on a viewpoint parameter determined by the determination unit, information used for identification of reflection characteristics of objects in the 3D scene corresponding to the pixels of the screen and specular reflection directions in positions of the objects; a first generation unit which is able to generate, using the information used for identification of an acquired the reflection characteristic acquired by the acquisition unit and the specular reflection direction, at least a low resolution indirect illumination buffer for a specular reflection corresponding to the viewpoint parameter and having a resolution less than the screen; a second generation unit which is able to generate, by increasing the resolution of the low resolution indirect illumination buffer generated by the first generation unit, indirect illumination buffers for a specular reflection having the same resolution as the screen; and a rendering unit which is able to render, using the indirect illumination buffer generated by the second generation unit, the screen into which the 3D scene is rendered for the viewpoint parameter, wherein the second generation unit generates a pixel of the indirect illumination buffer generated by the increase in resolution based on at least a level of similarity of specular reflection lobes, between an object corresponding to the pixel and an object corresponding to a pixel of the low resolution indirect illumination buffer used for generation of the pixel, for an eye direction defined by the viewpoint parameter determined by the determination unit and information used for identification of the specular reflection direction of each object.

The present invention in its third aspect provides a method of controlling an information processing apparatus that generates an indirect illumination buffer for a specular reflection used for rendering a 3D scene, comprising: a determining step of determining a viewpoint parameter for which the indirect illumination buffer is to be rendered; an acquisition step of acquiring a low resolution indirect illumination buffer having a resolution less than the indirect illumination buffer, and information used for identification of reflection characteristics of objects in the 3D scene corresponding to the pixels of the indirect illumination buffer to be generated and specular reflection directions in positions of the objects; and a generation step of generating the indirect illumination buffer by increasing the resolution of the low resolution indirect illumination buffer acquired in the acquisition step, wherein in the generation step a pixel of the indirect illumination buffer generated by the increase in resolution is generated based on at least a level of similarity of specular reflection lobes, between an object corresponding to the pixel and an object corresponding to a pixel of the low resolution indirect illumination buffer used for generation of the pixel, for an eye direction defined by the viewpoint parameter determined in the determining step and information used for identification of the specular reflection direction of each object.

The present invention in its fourth aspect provides a method of controlling an information processing apparatus that generates a screen into which a 3D scene is rendered, comprising: a determining step of determining a viewpoint parameter for which the screen is to be rendered; an acquisition step of acquiring, based on a viewpoint parameter determined in the determining step, information used for identification of reflection characteristics of objects in the 3D scene corresponding to the pixels of the screen and specular reflection directions in positions of the objects; a first generation step of generating, using the information used for identification of an acquired the reflection characteristic acquired in the acquisition step and the specular reflection direction, at least a low resolution indirect illumination buffer for a specular reflection corresponding to the viewpoint parameter and having a resolution less than the screen; a second generation step of generating, by increasing the resolution of the low resolution indirect illumination buffer generated in the first generation step, an indirect illumination buffer for a specular reflection having the same resolution as the screen; and a rendering step of rendering, using the indirect illumination buffer generated in the second generation step, the screen into which the 3D scene is rendered for the viewpoint parameter, wherein in second generation step, a pixel of the indirect illumination buffer generated by the increase in resolution is generated based on at least a level of similarity of specular reflection lobes, between an object corresponding to the pixel and an object corresponding to a pixel of the low resolution indirect illumination buffer used for generation of the pixel, for an eye direction defined by the viewpoint parameter determined in the determining step and information used for identification of the specular reflection direction of each object.

Further features of the present invention will become apparent from the following description of exemplary embodiments (with reference to the attached drawings).

DESCRIPTION OF THE EMBODIMENTS

Below, detailed explanation for an explanatory embodiment of the present invention will be given with reference to the drawings. Note that in the embodiment explained below, explanation will be given of an example in which the present invention is adopted to a PC, capable of generating a game screen to which a Global Illumination is applied, which is an example of an information processing apparatus. However, the present invention can be adopted to other devices capable of generating an indirect illumination buffer having a higher resolution from an indirect illumination buffer for a specular reflection.

<Configuration of the PC 100>

Figure 1:
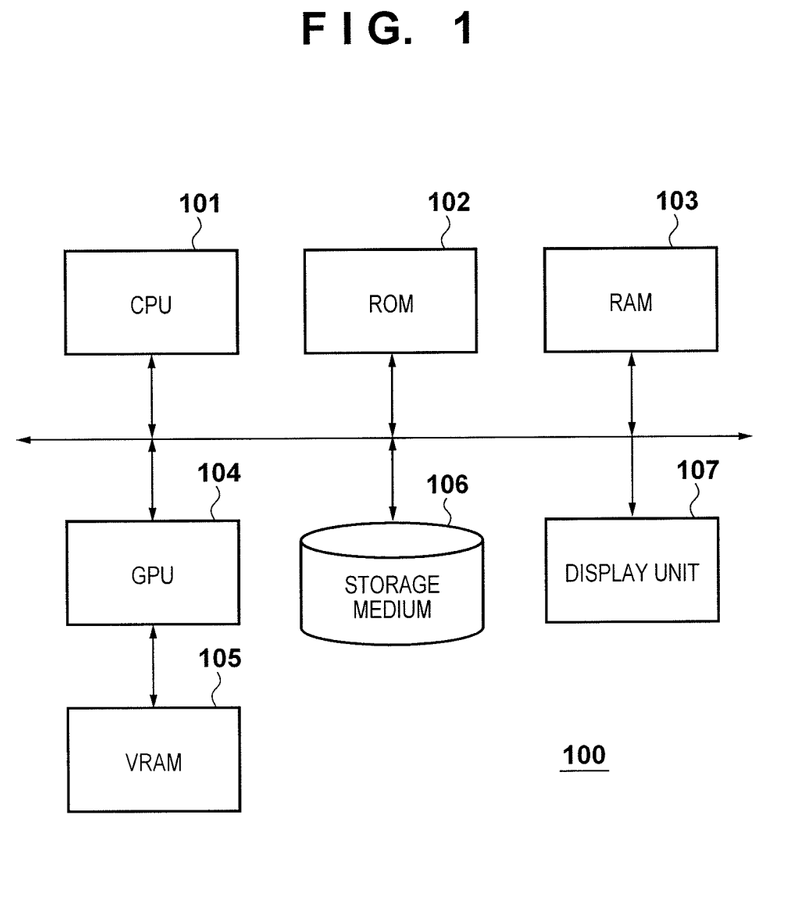
FIG. 1 is a block diagram showing a functional configuration of a PC 100 according to embodiments of the present invention.

FIG. 1 is a block diagram for showing a functional configuration of a PC 100 according to embodiments of the present invention.

A CPU 101 controls operation of each block that the PC 100 has. Specifically, the CPU 101 reads out and executes operation programs of the blocks stored in a ROM 102 or in a storage medium 106.

The ROM 102 is a rewritable, non-volatile memory, for example. The ROM 102, in addition to storing operation programs of the blocks of the PC 100, stores various parameters necessary for the operation of the blocks. A RAM 103 is a volatile memory. The RAM 103, as well as being a loading area of operation programs of the blocks, is also used as a storage area for storing intermediate data output in operation of the blocks.

A GPU 104 performs generation of game screens displayed on a later described display unit 107. The GPU 104, when it receives information (viewpoint parameters) of a position and direction of a camera used for rendering game screens and rendering commands from the CPU 101, reads out rendering objects for the rendering command from the storage medium 106, and stores it into a built in GPU memory (not shown). The GPU 104, after the rendering object is loaded into the cache memory, generates game screens by rendering into a connected VRAM 105 by performing a predetermined calculation.

Note, in this embodiment, explanation will be given for a Global Illumination calculation performed when a game screen of game content provided by generating game screens in real-time is rendered. As described above, because the Global Illumination calculation is processing having a large amount of calculation, the GPU 104 of this embodiment reduces the amount of calculation by performing deferred rendering including two stage rendering processing in the rendering processing for the generation of the game screens.

In the deferred rendering, unlike so called Forward Rendering in which a flow of shading and then rendering for each rendering object is taken, intermediate buffers (G-Buffers) of a predetermined channel for geometry indicating an entire game screen to be generated in the end are rendered without performing shading processing in the rendering processing of the preceding stage Specifically, in the rendering processing of the preceding stage, calculation of indirect illumination (a Global Illumination) or direct illumination is performed for the geometry, or a normal buffer, a diffuse buffer, a specular buffer and a depth buffer, etc. used for the rendering processing of a subsequent stage are rendered. Also, a buffer indicating a reflection characteristic of rendering objects corresponding to the pixels of the game screen used for illumination calculation is generated. The reflection characteristic may be a parameter indicating the shininess of a specular reflection that changes in accordance with the material, etc. of the rendering object, such as a Phong exponent of a Blinn-Phong reflection model, for example. Note, in the rendering processing of the preceding stage, the various intermediate buffers generated in the rendering processing, have the same resolution as game screens output in the end.

Also, in the rendering processing of the subsequent stage, the game screen that is the final output is generated by applying textures and an illumination calculation necessary for geometry based on the intermediate buffers. In this way, by executing the deferred rendering, calculation that becomes unnecessary due to occlusion is excluded, and game screens can be generated with a minimum necessary processing for the geometry.

Note, in this embodiment explanation is given having performance of the deferred rendering for generating game screens done by this kind of two stage rendering processing, but working of the present invention is not limited to this. In other words, the present invention may be applied in embodiments in which game screens are generated by performing at least two stages of rendering processing for reduction of the calculation amount, and may be applied in embodiments in which game screens are generated by the above described Forward Rendering. Also, the intermediate buffers generated in the rendering processing of the preceding stage are not limited to the above described buffers, and a buffer of another channel may be rendered.

The storage medium 106 is a storage apparatus connected detachably to the PC 100 such as, for example, an HDD. In this embodiment, the storage medium 106 records such things as a program of game processing for provision of game content, and data of each rendering object used in the rendering processing of the screens (models, textures, information of reflection characteristics, etc.), and light source information arranged in the 3D scene.

The display unit 107 is a display apparatus such as an LCD for example. The display unit 107 may be formed in the same body as the PC 100, or may be externally connected to the PC 100 by wire or wirelessly.

<Game Processing>

Figure 2:
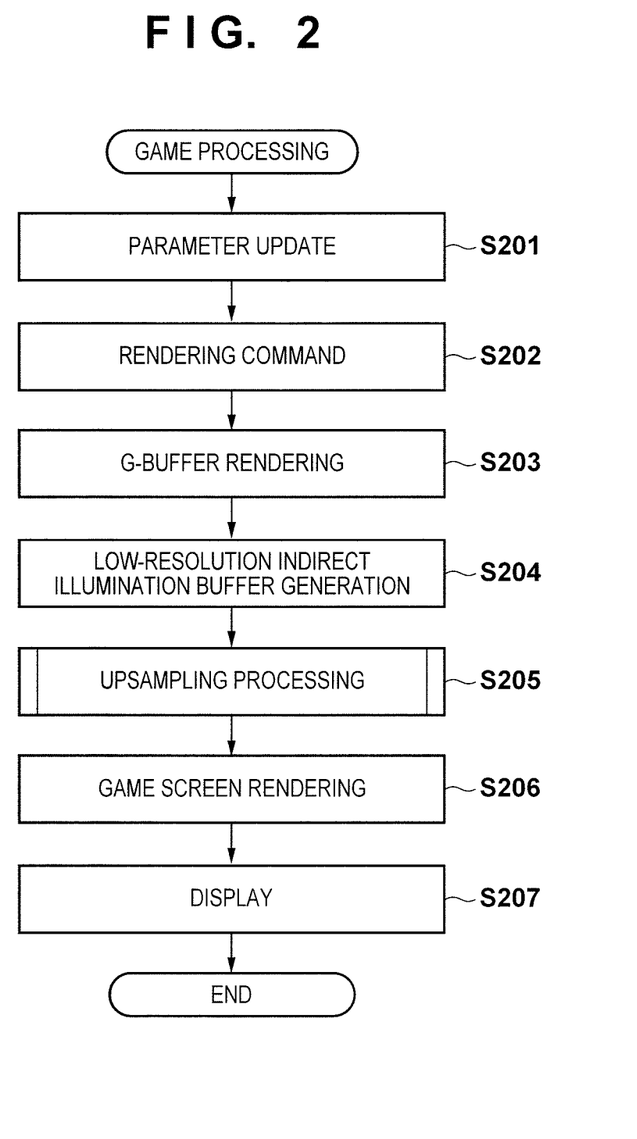
FIG. 2 is a flowchart showing an example of game processing executed on the PC 100 according to embodiments of the present invention.

Explanation will be given for specific processing of the game processing for generating, and displaying on the display unit 107, game screens for the game content executed in the PC 100 of this embodiment having this kind of configuration using the flowchart of FIG. 2. The CPU 101 can realize the processing corresponding to the flowchart by reading out a corresponding processing program stored in the storage medium 106, for example, loading it into the RAM 103, and executing it. Note, explanation is given having the game processing be something that, for example, is initiated when an application for the game content is activated, and is executed repeatedly for each frame.

In step S201, the CPU 101 reflects operation input by a user via the user interface (not shown), and changes various parameters for game progress necessary for the generation of game screens. In the various parameters for the game progress is included such things as position information of characters, etc. that exist in the 3D scene, and viewpoint parameters for generating the game screens.

In step S202, the CPU 101 transmits 3D scene a rendering command to the GPU 104 for the viewpoint parameter changed in step S201.

In step S203, the GPU 104 identifies a rendering object in the 3D scene included in a rendering scope according to a rendering command, executes rendering processing of the preceding stage using corresponding data, and renders the intermediate buffers (the G-Buffers) of a predetermined channel. In this embodiment, the intermediate buffers that are rendered are made to be the normal buffer, the diffuse buffer, the specular buffer, the depth buffer as described above, and a buffer (reflection characteristic buffer) that stores a Phong exponent of rendering objects corresponding to the pixels of the game screens. Note, the corresponding data is read out from the storage medium 106 by the GPU 104 when first rendered, for example, and stored in the GPU memory.

In step S204, the GPU 104 generates an indirect illumination buffer having a resolution less than the game screens to be generated. The indirect illumination buffer is generated using a method in which a Global Illumination calculation such as ray tracing, or voxel cone tracing is performed. The indirect illumination buffer, because its characteristics differ depending on the type of reflection as described above, is generated for diffuse reflection and specular reflection respectively in this embodiment. Note, because the present invention is something that improves deterioration of the level of reproduction in a case where an indirect illumination buffer for specular reflection is generated by upsampling, in the following explanation, explanation will be given mainly for an indirect illumination buffer for specular reflection. For an indirect illumination buffer for diffuse reflection pixel interpolation may be performed in upsampling by weighted addition in accordance with a normal vector, etc. as has been done conventionally.

In step S205, the GPU 104 upsamples the low resolution indirect illumination buffer generated in step S204, and executes upsampling processing for generating an indirect illumination buffer having a resolution the same as the game screens.

<Upsampling Processing>

Figure 3:
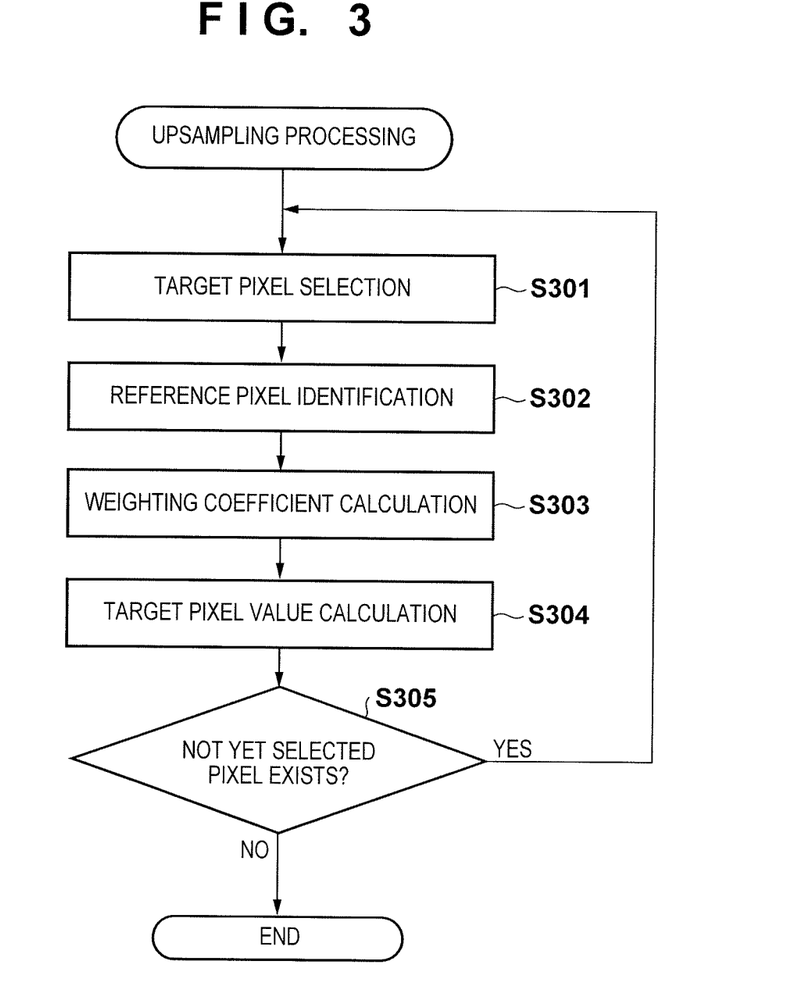
FIG. 3 is a flowchart showing an example of upsampling processing on an indirect illumination buffer for a specular reflection that a GPU 104 executes according to embodiments of the present invention.

Here, detailed explanation will be given for upsampling processing of an indirect illumination buffer for specular reflection in the upsampling processing executed in this step using the flowchart of FIG. 3.

In step S301, the GPU 104 selects a pixel (target pixel), out of the pixels generated by the upsampling, for which the pixel value calculation has yet to be completed.

In step S302, the GPU 104 identifies a pixel (reference pixel) referenced in the generation of the pixel value of the target pixel from pixels of the indirect illumination buffer which is at low resolution (low resolution indirect illumination buffer) for specular reflection. The reference pixel may be a pixel for which a corresponding pixel exists in the low resolution indirect illumination buffer out of the pixels included in a predetermined region of which the target pixel is the center in the generated indirect illumination buffer, for example.

In step S303, the GPU 104 calculates weighting coefficients corresponding to a level of similarity of the specular reflection lobes to that of the target pixel for each reference pixel.

The lobe of the reflection is defined by a Bidirectional Reflectance Distribution Function (BRDF) that expresses a reflection characteristic in object surfaces of rendering objects corresponding to each pixel. In a case where the object surface indicates a reflection characteristic of being uniformly spread as with a Lambertian surface, the BRDF becomes a constant. However, in a case where the reflection characteristic changes dependent upon the viewpoint as with a specular reflection, it is necessary for the BRDF consider each eye direction.

Note, there is a problem in that when the level of similarity of the lobes defined by the BRDF is made to be something to be defined as the inner product in a normalized distribution of the BRDF in an object surface corresponding to two pixels, there is not necessarily an analytical solution for the inner product of the BRDFs. For this reason, in this embodiment, the level of similarity of the lobes is calculated by using a BRDF model approximable in a spherical Gaussian in which the analytical solution of the inner product or the norm is provided. In particular, in a case where a Global Illumination calculation is performed by voxel cone tracing, because it is a presupposition that the BRDF used is approximable in a Gaussian distribution, it has a strong affinity with the method recited in this embodiment. However, embodiments of the present invention are not limited to this, and as long as a level of similarity of the specular reflection lobes in an object surface corresponding to two pixels is calculable, embodiments are possible. In other words, the present invention is not limited to a case in which the existing approximation method which obtains the inner product of the BRDF can be adopted, and may be embodied for a case in which a method that provides the level of similarity of lobes quantitatively can be adopted.

Below explanation will be given for derivation of a weighting function providing weighting coefficients corresponding to the levels of similarity of specular reflection lobes for a BRDF approximable in a spherical Gaussian.

Firstly, the BRDF: $f(\omega_o, \omega)$ of the reflection being reflected in the eye direction $\omega_o$ of input from the incident direction $\omega$ has a distribution function regarding a halfway vector: $\omega_h$ of an incident direction and a reflection direction (an eye direction) and a normal n. Several of these kinds of distribution functions, can be expressed approximating in a spherical Gaussian as:

$$f(\omega_o, \omega) \approx G(\omega_h, n, \lambda, \mu)$$

as is recited in the document, "All-Frequency Rendering of Dynamic, Spatially-Varying Reflectance".

Furthermore, when transforming the spherical Gaussian to a distribution related to an incident direction $\omega$ by spherical warping it becomes:

$$G(\omega_h, n, \lambda, \mu) \approx G\left(\omega, \omega_r, \frac{\lambda}{4(n \cdot \omega_r)}, \mu\right),$$

where $\omega_r$ is a completely specularly reflecting direction, and using the eye direction and the normal is defined as:

$$\omega_r = 2(\omega_o \cdot n) - \omega_o$$

In this embodiment, the BRDF for target pixel i and reference pixel j is approximated with $$f_i(\omega_{o,i}, \omega) \approx G(\omega, \omega_{r,i}, \lambda_i, \mu_i)$$

$$f_j(\omega_{o,j}, \omega) \approx G(\omega, \omega_{r,j}, \lambda_j, \mu_j),$$

the level of similarity of the specular reflection lobes is defined as the inner product of these in the normalized distribution, and is used as the weighting function of these.

Figure 4:
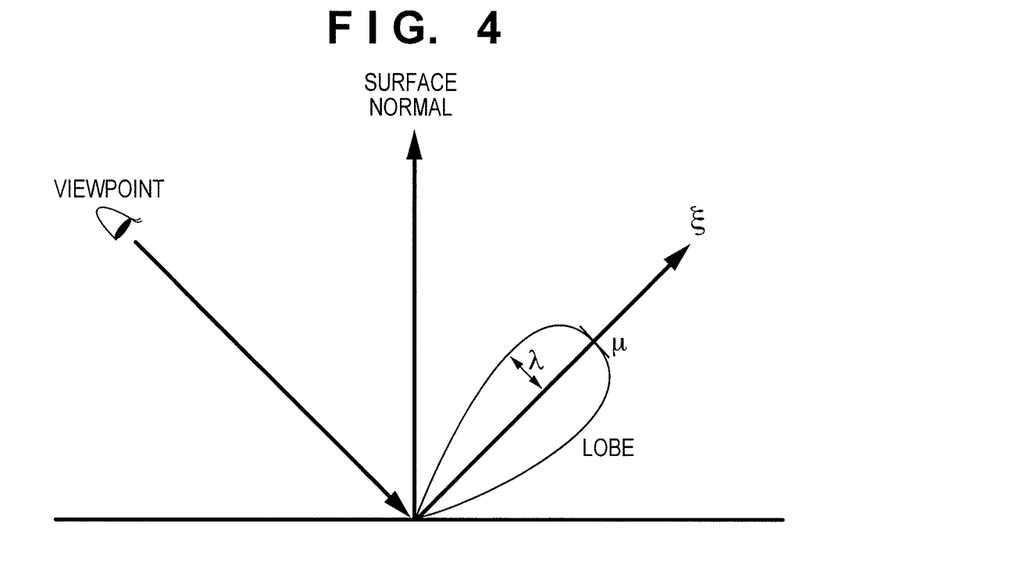
FIG. 4 is a view for explaining a specular reflection lobe.

The spherical Gaussian is defined with $$G(\omega, \xi, \lambda, \mu) = \mu \exp(\lambda((\omega \cdot \xi) - 1)),$$

and $\xi$ in this equation indicates the axis vector of the lobe as shown in FIG. 4, $\lambda$ indicates the shininess of the lobe which is dependent upon the material and $\mu$ indicates the amplitude of the lobe. The analytical solution of the inner product of the spherical Gaussian is provided as $$G(\omega, \xi_i, \lambda_i, \mu_i) \cdot G(\omega, \xi_j, \lambda_j, \mu_j) = \int_\Omega G(\omega, \xi_i, \lambda_i, \mu_i) G(\omega, \xi_j, \lambda_j, \mu_j) d\omega$$

$$= \frac{4\pi \mu_i \mu_j \sinh(\|\lambda_i \xi_i + \lambda_j \xi_j\|)}{\exp(\lambda_i + \lambda_j) \|\lambda_i \xi_i + \lambda_j \xi_j\|}$$

and the norm from the inner product is provided as $$\|G(\omega, \xi, \lambda, \mu)\| = \sqrt{G(\omega, \xi, \lambda, \mu) \cdot G(\omega, \xi, \lambda, \mu)}$$

$$= \mu \sqrt{\frac{\pi(1 - \exp(-4\lambda))}{\lambda}}$$

In other words, the weighting function $\omega_{i,j}$ for the target pixel i and the reference pixel j is derived as $$w_{i,j} = \frac{f_i(\omega_{o,i}, \omega)}{\|f_i(\omega_{o,i}, \omega)\|} \cdot \frac{f_j(\omega_{o,j}, \omega)}{\|f_j(\omega_{o,j}, \omega)\|}$$

$$\approx \frac{G(\omega, \omega_{r,i}, \lambda_i, \mu_i)}{\|G(\omega, \omega_{r,i}, \lambda_i, \mu_i)\|} \cdot \frac{G(\omega, \omega_{r,j}, \lambda_j, \mu_j)}{\|G(\omega, \omega_{r,j}, \lambda_j, \mu_j)\|}$$

$$= \frac{4 \sinh(\|\lambda_i \omega_{r,i} + \lambda_j \omega_{r,j}\|)}{\exp(\lambda_i + \lambda_j) \|\lambda_i \omega_{r,i} + \lambda_j \omega_{r,j}\|}$$

$$\sqrt{\frac{\lambda_i \lambda_j}{(1-\exp(-4\lambda_i))(1-\exp(-4\lambda_j))}}$$

from these equations ($0 \leq w_{i,j} \leq 1$).

In other words, for the target pixel and the reference pixel, a weighting function which is the level of similarity of the specular reflection lobes can be calculated from the completely specularly reflecting direction defined by the shininess $\lambda$ obtained by transforming the Phong exponent of the reflection characteristic buffer, the three dimensional position of the object surface corresponding to the viewpoint parameters and each pixel, and its normal vectors. Note, the three dimensional position of the corresponding object surface can be acquired from the viewpoint parameter and the depth buffer, and the surface of the normal vector can be acquired from the normal buffer. Note, the three dimensional position of the corresponding object surface need not be calculated from the viewpoint parameter and the depth buffer, and, for example, rendering a separate buffer indicating the three dimensional position as the G-Buffer and using it is also possible.

The GPU 104 calculates the weighting coefficients for each reference pixel in accordance with the weighting function, and moves the processing on to step S304.

In step S304, the GPU 104 calculates the pixel value of the target pixel generated by the upsampling using the weighting coefficients for each reference pixel calculated in step S303. Specifically, the pixel value Si of the target pixel can be calculated using the pixel value Sj of each reference pixel as $$S_i = \frac{\sum_j (w_{i,j} \cdot S_j)}{\sum_j w_{i,j}}$$

In other words, in the upsampling processing, because a reflectance of the reference pixels on the target pixel according to the level of similarity of the specular reflection lobes can be changed, a more ideal indirect illumination buffer for specular reflection can be generated compared to the conventional method in which interpolation is performed in accordance with the level of similarity of the normal vector. Note, in this embodiment, in order that the invention be understood, explanation is given for only weighting calculation (out of interpolation calculations for Bilateral upsampling) based on the level of similarity of the specular reflection lobes, but other than this, weighting calculation in accordance with the depth and distance of rendering objects corresponding to each pixel the above described may also be considered.

In step S305, the GPU 104 determines whether or not a pixel for which the pixel value calculation has yet to be completed, out of the pixels to be generated by the upsampling exists. The GPU 104, in a case where it is determined that a pixel for which the pixel value calculation has yet to be completed exists, returns the processing to step S301, and in a case where it is determined that one does not exist, the upsampling processing completes, moves the processing to the game processing of step S206.

Note, in the upsampling processing of this embodiment, in order to simplify the explanation, explanation was given having calculation of the pixel values performed by selecting the target pixels in order, but it should be easily understood that the upsampling processing may be executed in parallel by a plurality of calculation cores of the GPU 104.

In step S206, the GPU 104, referencing the G-Buffer, applies the necessary decal texture, performs the direct illumination calculation processing, and renders the game screens (the rendering processing of the subsequent stage completes).

In step S207, the CPU 101 displays by transferring the game screen rendered into the VRAM 105 by the GPU 104 to the display unit 107, and the game processing completes.

In this way, in the game processing of this embodiment, it is possible to obtain an indirect illumination buffer in which the specular reflection is suitably reproduced because it is possible, for generation of the indirect illumination buffer for specular reflection, to:
1. reduce the calculation amount by calculating Global Illumination at a low resolution
2. interpolate in accordance with the level of similarity of the specular reflection lobes according to the reflection characteristic of each rendering object when upsampling.

Note, in a case where any of the weighting coefficients for the reference pixel referenced for the generation of the target pixel is not more than a predetermined value determined to be dissimilar, it can be considered that calculating the pixel values of the target pixels by interpolation is not suitable. For example, as in FIG. 5, in the distribution indicating the sum total of the weighting coefficient of the reference pixel used for generation of each pixel, for regions in which the sum total is not more than a predetermined value (the color close to black in the figure), it can be considered that the specular reflection cannot be reproduced in the corresponding object surface suitably, and the level of reliability will be low. For this reason, updating to a more correct value may be performed by performing additional sampling (Global Illumination calculation) at a resolution of the game screens (rather than a low resolution), or at a resolution higher than the resolution at which the low resolution indirect illumination buffer is generated. Note, for the pixels to be generated by the upsampling in the example of FIG. 5, the reference pixels are assumed to be the same number, and explanation was given having the existence or absence of the additional sampling determined by the distribution indicating the sum total of the weighting coefficients, but it should be easily understood that the generation standard of the distribution used for the determination is not limited to this.

Figure 5:
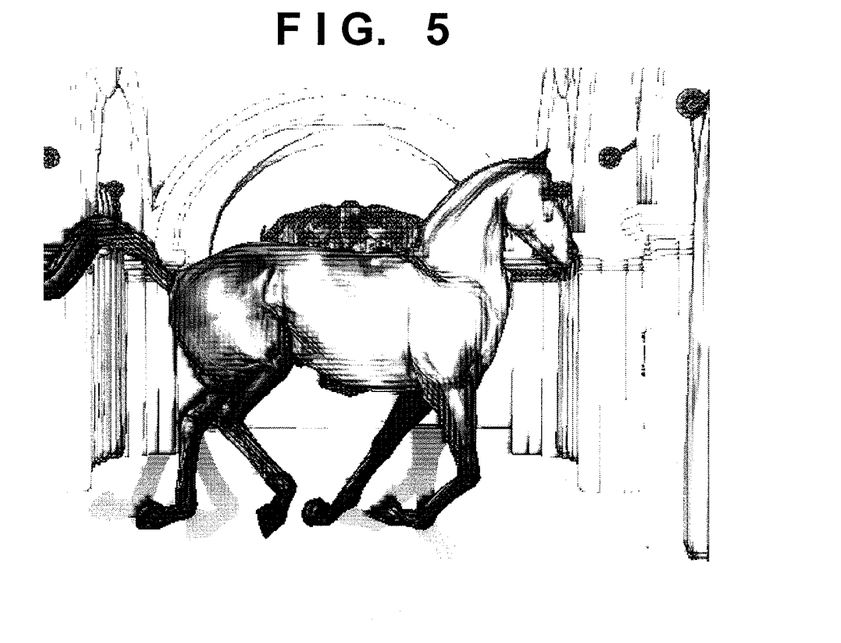
FIG. 5 is a view showing a location for which it is assumed that upsampling processing having a low level of reliability was performed.

In this way, by determining the existence or absence of the additional sampling using the weighting coefficients indicating the level of similarity of the specular reflection lobes, the indirect illumination buffer for a more correct specular reflection can be obtained. In other words, because the interpolation processing is performed in the upsampling processing, in a case where an appropriate weighting is not performed as in conventional methods using the normal vector, inconsistencies in the obtained indirect illumination buffer arise. In the inconsistencies occurring in this way are included aliasing and flickering for which detection is easy, but also included are those for which detection is difficult or impossible such as blurring. In other words, even for regions for which determination to perform additional sampling would not be made by detection of inconsistencies in conventional methods, such as when blurring occurs, detection is possible by employing the distribution of the above described weighting coefficients and the image quality can be improved.

Also, in this embodiment, explanation was given having the indirect illumination buffer used for rendering of the game screens be generated by upsampling from one low resolution indirect illumination buffer, but there is no need for the referenced low resolution indirect illumination buffer to be limited to one. In other words, upsampling of the low resolution indirect illumination buffer sampled in a plurality of frames while changing each sampling position in a round robin may be used. In such a case, by causing to be different the weighting coefficients applied in accordance with the sampling time period (for example, the older the generated frame the smaller the coefficient), it is possible to use the weighting calculation while considering viewpoint movement and light source movement. Note, in a case where this kind of time direction low resolution indirect illumination buffer is used, there is no need to maintain a plurality of low resolution indirect illumination buffers. In other words, configuration may be taken such that a buffer having the same resolution as the game screens is prepared, for example, and the corresponding pixel updated using the low resolution indirect illumination buffer generated for the current frame after the upsampling processing is referenced in the processing of the next frame.

As explained above, the information processing apparatus of this embodiment is able to reproduce, suitably and at high speed, a specular reflection in a 3D scene. Specifically, the information processing apparatus acquires a low resolution indirect illumination buffer having a resolution less than an indirect illumination buffer information used for specifying a specular reflection direction in a position of an object and a reflection characteristic of the object in a 3D scene corresponding to each pixel of the indirect illumination buffer to be generated. Then it generates an indirect illumination buffer by increasing the resolution of the low resolution indirect illumination buffer. Here the information processing apparatus generates the pixels of the indirect illumination buffer generated by the increase in resolution based on at least the level of similarity of the specular reflection lobes of objects corresponding to the pixels and objects corresponding to the pixels of the low resolution indirect illumination buffer used for the generation of the pixels.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the method of controlling according to the present invention are realizable by a program executing the methods on a computer. The program is providable/distributable by being stored on a computer-readable storage medium or through an electronic communication line.

This application claims the benefit of Japanese Patent Application No. 2013-090778, filed Apr. 23, 2013, which is hereby incorporated by reference herein in its entirety.

What is claimed is:

1. An information processing apparatus that generates an indirect illumination buffer for a specular reflection used for rendering a 3D scene, comprising:
a central processor;
a memory including a set of executable instructions that, when executed by the central processor, causes the central processor to perform operations including:
determining a viewpoint parameter for which the indirect illumination buffer is to be rendered; and
acquiring a low resolution indirect illumination buffer having a resolution less than the indirect illumination buffer, and information used for identification of reflection characteristics of objects in the 3D scene corresponding to pixels of the indirect illumination buffer to be generated and specular reflection directions in positions of the objects; and
a graphics processor which is able to generate the indirect illumination buffer by increasing the resolution of the low resolution indirect illumination buffer acquired by the central processor,
wherein the graphics processor generates a pixel of the indirect illumination buffer generated by an increase in resolution based on at least a level of similarity of specular reflection lobes, between an object corresponding to the pixel and an object corresponding to a pixel of the low resolution indirect illumination buffer used for generation of the pixel, for an eye direction defined by the viewpoint parameter determined by the central processor and information used for identification of the specular reflection direction of each object.

2. The apparatus according to claim 1, wherein the graphics processor calculates a pixel value of the pixel of the indirect illumination buffer generated by the increase in resolution by weighted addition of pixel values of a plurality of pixels used for the generation in accordance with the level of similarity.

3. The apparatus according to claim 2, wherein the graphics processor further calculates the pixel value of the pixel of the indirect illumination buffer generated by the increase in resolution, in accordance with a distance between an object corresponding to the pixel and an object corresponding to a pixel used for the generation and depth values of the objects, by weighted addition of a plurality of pixel values of pixels used in the generation.

4. The apparatus according to claim 2, wherein the central processor acquires a plurality of the low resolution indirect illumination buffer generated for different times, and
the graphics processor further calculates, in accordance with a time at which the low resolution indirect illumination buffer in which the pixels used for the generation are included is generated, the pixel value of the pixel of the indirect illumination buffer generated by the increase in resolution by weighted addition of pixel values of a plurality of pixels used for the generation.

5. The apparatus according to claim 1, wherein a specular reflection lobe is defined by a bidirectional reflectance distribution function defined by a reflection characteristic of a target object, and
the level of similarity is defined by an inner product of bidirectional reflectance distribution functions for objects corresponding to two pixels.

6. The apparatus according to claim 5 wherein the graphics processor calculates the level of similarity by obtaining an inner product of a spherical Gaussian approximating a bidirectional reflectance distribution functions for objects corresponding to two pixels.

7. A non-transitory computer-readable storage medium storing a program for causing a computer to function as the memory, the central processor, and the graphics processor of the information processing apparatus according to claim 1.

8. An information processing apparatus that generates a screen into which a 3D scene is rendered, comprising:
a central processor;
a memory including a set of executable instructions that, when executed by the central processor, causes the central processor to perform operations including:
a determining a viewpoint parameter for which the screen is to be rendered; and
acquiring, based on a viewpoint parameter determined by the determining, information used for identification of reflection characteristics of objects in the 3D scene corresponding to pixels of the screen and specular reflection directions in positions of the objects; and a graphics processor which is able to: generate, using the information used for identification of the reflection characteristics acquired by the central processor and the specular reflection direction, at least a low resolution indirect illumination buffer for a specular reflection corresponding to the viewpoint parameter and having a resolution less than the screen;

generate, by increasing the resolution of the low resolution indirect illumination buffer, indirect illumination buffers for a specular reflection having a same resolution as the screen; and render, using the indirect illumination buffer, the screen into which the 3D scene is rendered for the viewpoint parameter, wherein the graphics processor generates a pixel of the indirect illumination buffer generated by an increase in resolution based on at least a level of similarity of specular reflection lobes, between an object corresponding to the pixel and an object corresponding to a pixel of the low resolution indirect illumination buffer used for generation of the pixel, for an eye direction defined by the viewpoint parameter determined by the central processor and information used for identification of the specular reflection direction of each object.

9. The apparatus according to claim 8, wherein the graphics processor calculates a pixel value of the pixel of the indirect illumination buffer generated by the increase in resolution by weighted addition of pixel values of a plurality of pixels used for the generation in accordance with the level of similarity.

10. The apparatus according to claim 8, wherein the graphics processor is further able to partially generate and update an indirect illumination buffer at the same resolution as the screen using information used for identification of the specular reflection direction and the reflection characteristic for a pixel of a region in which the level of similarity with the pixel of the low resolution indirect illumination buffer used for generation, out of the indirect illumination buffers generated by the graphics processor, is not more than a predetermined value.

11. The apparatus according to claim 8, wherein the graphics processor renders the screen by at least two stages of rendering processing, the central processor acquires information used for identification of the specular reflection direction and the reflection characteristic from an intermediate buffer of a predetermined channel referenced in rendering processing of a subsequent stage rendered in rendering processing of a preceding stage of the graphics processor, and the graphics processor renders the screen using the indirect illumination buffer in the rendering processing of the subsequent stage.

12. A method of controlling an information processing apparatus that generates an indirect illumination buffer for a specular reflection used for rendering a 3D scene, comprising:

determining a viewpoint parameter for which the indirect illumination buffer is to be rendered;

acquiring a low resolution indirect illumination buffer having a resolution less than the indirect illumination buffer, and information used for identification of reflection characteristics of objects in the 3D scene corresponding to pixels of the indirect illumination buffer to be generated and specular reflection directions in positions of the objects; and generating the indirect illumination buffer by increasing the resolution of the low resolution indirect illumination buffer acquired in the acquiring, wherein in the generating, a pixel of the indirect illumination buffer generated by an increase in resolution is generated based on at least a level of similarity of specular reflection lobes, between an object corresponding to the pixel and an object corresponding to a pixel of the low resolution indirect illumination buffer used for generation of the pixel, for an eye direction defined by the viewpoint parameter determined in the determining and information used for identification of the specular reflection direction of each object.

13. A method of controlling an information processing apparatus that generates a screen into which a 3D scene is rendered, comprising:

determining a viewpoint parameter for which the screen is to be rendered;

acquiring, based on a viewpoint parameter determined in the determining, information used for identification of reflection characteristics of objects in the 3D scene corresponding to pixels of the screen and specular reflection directions in positions of the objects;

first generating, using the information used for identification of the reflection characteristics acquired in the acquiring and the specular reflection direction, at least a low resolution indirect illumination buffer for a specular reflection corresponding to the viewpoint parameter and having a resolution less than the screen;

second generating, by increasing the resolution of the low resolution indirect illumination buffer generated in the first generating, an indirect illumination buffer for a specular reflection having a same resolution as the screen; and rendering, using the indirect illumination buffer generated in the second generating, the screen into which the 3D scene is rendered for the viewpoint parameter, wherein in the second generating, a pixel of the indirect illumination buffer generated by an increase in resolution is generated based on at least a level of similarity of specular reflection lobes, between an object corresponding to the pixel and an object corresponding to a pixel of the low resolution indirect illumination buffer used for generation of the pixel, for an eye direction defined by the viewpoint parameter determined in the determining and information used for identification of the specular reflection direction of each object.

* * * * *